April 17, 1945.  A. BURCKHARDT ET AL  2,374,076
LIQUID LEVEL CONTROL MEANS
Filed July 27, 1943
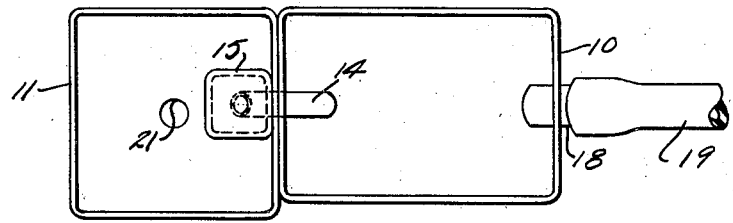
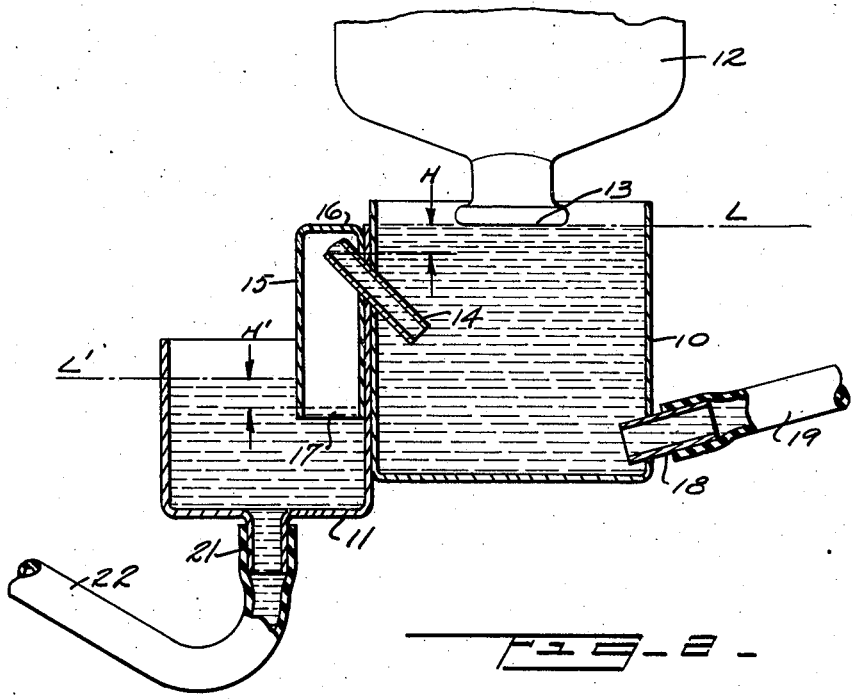
INVENTORS
Alfred Burckhardt
Joseph V. Edman
BY
Edwin H. Owen
ATTORNEY Patented Apr. 17, 1945

2,374,076

UNITED STATES PATENT OFFICE 2,374,076

LIQUID LEVEL CONTROL MEANS

Alfred Burckhardt and Joseph V. Edman, Stamford, Conn., assignors to Pitney-Bowes Postage Meter Co., Stamford, Conn., a corporation of Delaware Application July 27, 1943, Serial No. 496,297

4 Claims. (Cl. 137—68)

This invention relates to a device for providing liquid at two different levels from a single source of liquid supply.

It is the object of the invention to provide a primary liquid supply container wherein a predetermined level is normally maintained, and a secondary container, which is adapted to receive a liquid supply through an outlet from the primary container, and to further provide a pressure chamber wherein an increase of air pressure is effected when the liquid rises above a predetermined level in the secondary container which will cut off the supply from the primary container after rising to a predetermined level.

With the above and other objects in view, which will appear as the description proceeds, the invention resides in the combination and arrangement of parts and in the details of construction hereinafter described and claimed, it being understood that various changes in the precise embodiment of the invention herein disclosed may be made within the scope of what is claimed without departing from the spirit of the invention.

A preferred embodiment of the invention is illustrated in the accompanying drawing, wherein:

Fig. 1 is a plan view of the device; and

Fig. 2 is a vertical sectional view through the device as taken along the line 2—2 of Fig. 1.

Referring to the drawing in detail, the device comprises a primary container 10, and a secondary container 11, which are adapted to be joined together as indicated in the drawing or may be formed as an integral unit.

A liquid supply is provided for the primary container 10 by means of an inverted bottle 12, the level being regulated in accordance with the position of the mouth of said bottle in a well known manner, so long as liquid is contained within the bottle.

An outlet comprising a tube 14, is inserted in the primary container 10, whereby liquid may flow from the container 10 to the container 11. Said tube 14 is preferably arranged in the manner indicated in Fig. 2 with the one end thereof extending downwardly into the container 10 and with the opposite end thereof projecting outwardly from the container 10, with the outlet end thereof positioned below the normal level of the liquid in said container 10.

An air pressure chamber is provided in the form of a closure or tubular member 15, which member is closed at the top, as indicated at 16, and has an open lower end as indicated at 17. Said tubular member 15 is adapted to envelope the outlet end of the drain tube 14 and has a larger tubular cross section than that of the outlet tube 14. The tubular member 15 is adapted to be secured to the container 10 or may be formed as integral part thereof.

In operation, when liquid reaches a level in the primary container 10, as limited by the mouth 13 of the bottle 12, a drain will be effected through the tube 14 into the secondary container 11. The liquid, upon rising in the container 11, will eventually pass over the open end 17 of the tubular pressure chamber 15, and will thereafter build up a pressure in said chamber. As the liquid continues to rise in the secondary container 11, the pressure will increase until it is equal to the pressure of the liquid within the tube 14, thereby stopping the flow. The level of the liquid within the secondary container 11 will be maintained at a distance above the level within the pressure chamber 15, the said distance being equal to the head maintained above the discharge end of the outlet, as indicated by the reference characters H and H'. Hence, a level is maintained within the secondary container 11, which is lower than the normal liquid level maintained in the chamber 10.

Through a discharge outlet 18 and hose connection 19, a supply of liquid is adapted to be provided from the container 10 at the level indicated at L, for any desired means. In the same manner liquid is adapted to be supplied at a level L' from the container 11, through a discharge outlet 21 and hose connection 22.

As the liquid level recedes slightly in the secondary container 11, the air pressure in chamber 15 decreases accordingly and a slight flow from outlet tube 14 will start. This slight flow will again increase the pressure sufficiently to immediately stop the flow, thus maintaining a substantially constant level in the secondary container.

Having described the invention, what is claimed is:

1. A two level liquid control system comprising two adjacent liquid containers, means for supplying liquid to one of said containers and maintaining a predetermined liquid level therein, outlet means whereby liquid may flow from the first to the second of said two containers, and a pressure chamber enveloping a portion of said outlet means and having an open mouth projecting into the second named container, wherein air pressure will build up as the liquid rises within the open mouth of the pressure chamber, to thereby stop the flow through the outlet means when the pressure in the chamber equals the pressure of the liquid flow from the outlet means.

2. A two level liquid control device comprising a primary container having liquid maintained therein at a predetermined level; a secondary container arranged to receive liquid from the primary container; outlet means through which liquid may flow from the primary to the secondary container; a pressure chamber associated with said outlet means including a tubular member enveloping the outlet end of said outlet means and having its lower end open and projecting into the secondary container; whereby liquid flowing from said outlet means into the secondary container will, upon rising above the open end of the pressure chamber, effect sufficient pressure within the tubular member to stop the flow of liquid through the outlet means from the primary container and thereby produce a controlled liquid level in the secondary container at a different level from that in the primary container.

3. A two level liquid control device comprising a primary container having liquid maintained therein at a predetermined level; a secondary container arranged to receive liquid from the primary container, means including a discharge tube having an inlet end projecting into the primary container and an outlet end projecting outwardly from said primary container, whereby liquid may flow from the primary to the secondary container; a pressure chamber associated with the outward tube projection including a tubular member having its lower end open and projecting into the secondary container, whereby liquid flowing from said outlet into the secondary container will, upon rising above the open end of the pressure chamber, effect a pressure within the pressure chamber equal to the pressure at the outlet end of the discharge tube to stop the flow of liquid through the tube outlet in the primary container, and thereby produce a controlled liquid level in the secondary container at a different level from that in the primary container.

4. A two level liquid control device comprising a container having liquid maintained therein at a predetermined level, a second container arranged to receive liquid from the first named container, an outlet comprising a tube projecting from the first named container through which liquid may flow from the first to the second named container, a tubular closure enveloping the outlet end of the outlet tube and having an open lower end projecting into the second named container, said tubular closure having a larger opening than the discharge end of the outlet tube, whereby liquid may flow from the first named container to the second and when the liquid in the second named container rises above the open lower end of the tubular closure, a pressure will be effected within the tubular closure to stop the flow through the outlet tube.

ALFRED BURCKHARDT.
JOSEPH V. EDMAN.